United States Patent [19]
Tebbe et al.

[11] Patent Number: 5,364,607
[45] Date of Patent: Nov. 15, 1994

[54] BORIDES AND BORIDE PRECURSORS DEPOSITED FROM SOLUTION

[75] Inventors: Frederick N. Tebbe, Hockessin; Ralph T. Baker, Wilmington, both of Del.

[73] Assignee: E. I. Du Pont de Nemours and Company, Wilmington, Del.

[21] Appl. No.: 836,304

[22] PCT Filed: Sep. 8, 1989

[86] PCT No.: PCT/US89/03883
§ 371 Date: Mar. 4, 1992
§ 102(e) Date: Mar. 4, 1992

[87] PCT Pub. No.: WO91/03420
PCT Pub. Date: Mar. 21, 1991

[51] Int. Cl.$^5$ .......................... C01B 6/15; C01B 6/23; C01B 35/04
[52] U.S. Cl. .................... 423/286; 423/297; 556/51
[58] Field of Search .................... 423/286, 297; 556/51

[56] References Cited

U.S. PATENT DOCUMENTS

| | | | |
|---|---|---|---|
| 3,169,045 | 2/1965 | Miller et al. | 423/286 |
| 3,413,134 | 11/1968 | Kaufman et al. | 423/297 |
| 3,457,050 | 7/1969 | Sauer | 423/286 |
| 3,772,426 | 11/1973 | Aftandilian | 423/286 |
| 4,414,188 | 11/1983 | Becker | 423/297 |

FOREIGN PATENT DOCUMENTS

| | | | |
|---|---|---|---|
| 956256 | 4/1964 | United Kingdom | 423/286 |
| 1096901 | 9/1985 | U.S.S.R. | 423/286 |

OTHER PUBLICATIONS

N. Nakano et al, "Single Crystal Growth of IVa–Diborides from Metal Solutions", *Journal of Crystal Growth* 24/25 (1974), 679–682, North–Holland Publishing Co.

*Primary Examiner*—Wayne Langel

[57] ABSTRACT

Zirconium and hafnium boride precursor complexes are prepared by deposition from solution, and yield metal borides upon heating at mild temperatures and ambient pressure.

15 Claims, 2 Drawing Sheets

BORIDES AND BORIDE PRECURSORS DEPOSITED FROM SOLUTION

FIELD OF THE INVENTION

Metal borides are hard, refractory, highly conductive and chemically inert materials which have many potential applications in the ceramic, electronic and optical industries. Obstacles to the development of uses for the borides have been that high temperatures or vacuum conditions have been required for their synthesis. The present invention relates to novel zirconium and hafnium boride precursor complexes and processes for their preparation by deposition from solution. The present invention further relates to the metal borides obtained upon heating the novel precursors at mild temperatures and ambient pressure.

BACKGROUND OF THE INVENTION

Several methods for the preparation of metal borides are known including direct synthesis from the elements, reduction of mixtures of metal oxides and boron oxide by carbon, reduction of metal oxides with boron carbide and carbon, and reduction of mixtures of metal halide and boron trihalide by hydrogen. Each of these requires high temperatures, in excess of about 1200° C., usually near 2000° C.

More recently metal borides have been synthesized by thermal decomposition of gaseous metal borohydrides at lower temperatures. Titanium diboride, zirconium diboride and hafnium diboride thin films were obtained by using gaseous chemical vapor deposition at about 200° C. of the respective tetrahydroborate precursors; see Jensen, J. A., et al., *J. Am. Chem. Soc.*, 110, 1643-1644 (1988).

The synthesis of zirconium boride, $ZrB_2$, from zirconium borohydride, $Zr(BH_4)_4$, was explored by a variety of methods including gaseous chemical vapor deposition in a hot tube, laser chemical vapor deposition with both continuous-wave and pulsed lasers, and continuous-wave laser synthesis of fine powders. Products made at high temperature contained excess boron, while those made at low temperature were boron deficient. The gaseous chemical vapor deposition and laser chemical vapor deposition techniques using zirconium borohydride were deemed more promising than older conventional techniques and were considered predictive of the behavior of hafnium borohydride and titanium borohydride; see Rice, G. W., *J. Am. Ceram. Soc.*, 71(4), C-181-C-183 (1988).

Wayda, A. L., et al., *Appl. Phys. Lett.*, 53, (5), Aug. 1, 1988, reported deposition on various substrates of films of zirconium and hafnium borides by the low temperature (100°–270° C.) thermal decomposition of gaseous $M(BH_4)_4$ wherein M is zirconium or hafnium. The resultant films were characterized as having favorable mechanical and electronic properties with only surface oxide contamination. Thus the metal borohydrides were considered to be excellent precursor complexes for vapor phase thermal decomposition to yield metal boride films.

These prior art techniques for generation of the metal borides involve deposition from the gas phase, such as chemical vapor deposition or laser vapor deposition. The deposition of metal boride precursors from solution at ambient pressure is easier to practice than gas phase routes and could prove to be less expensive.

It is therefore an object of the present invention to provide processes for deposition of metal boride precursors from the solution phase. It is a further object of the present invention to provide novel metal boride precursor complexes. It is a further object of the present invention to provide metal borides from these novel precursor complexes.

DETAILED DESCRIPTION OF THE INVENTION

Figure 1:
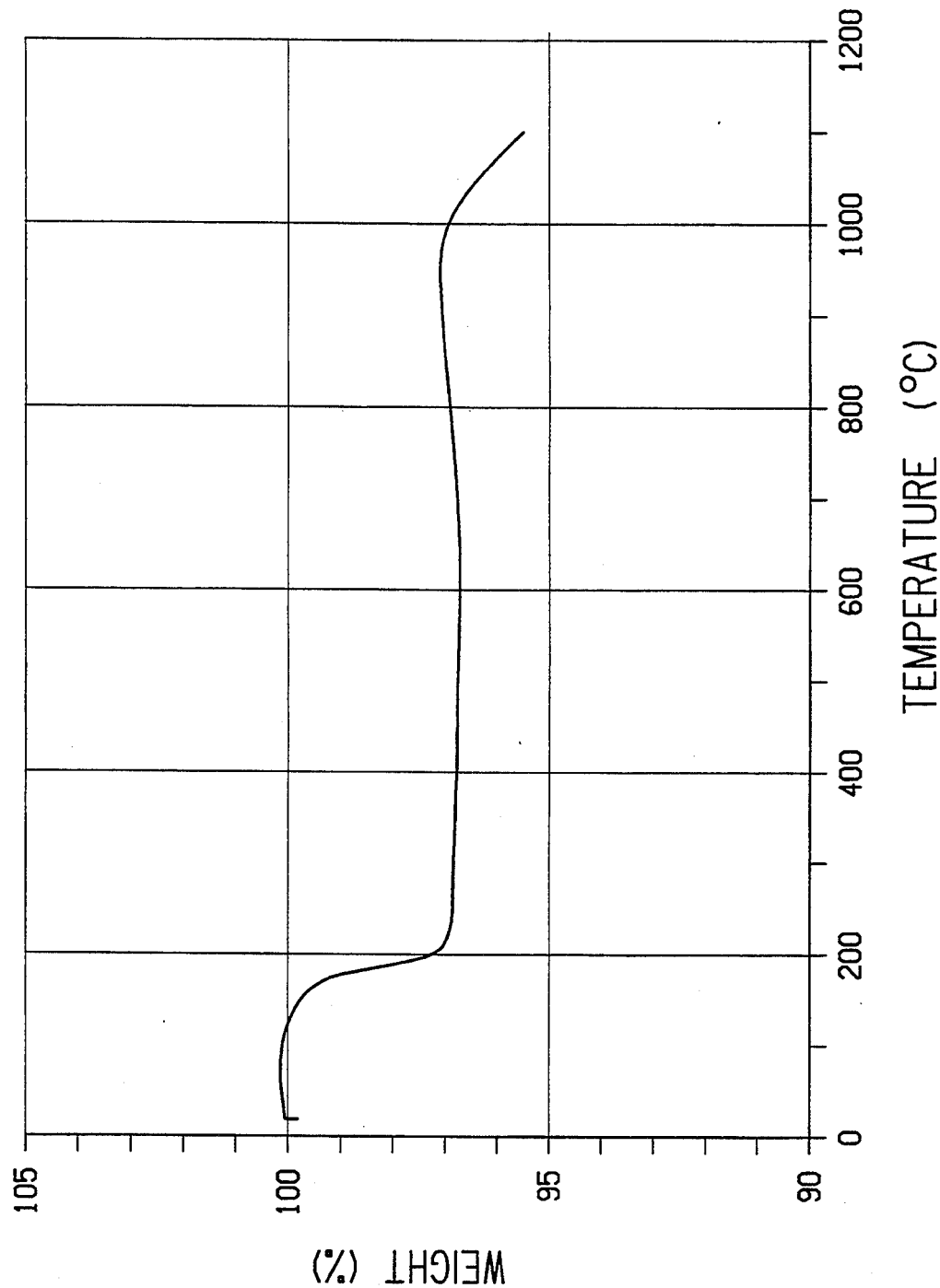
FIG. 1 is a thermogravimetric analysis (TGA) of the product of Example 2.

One aspect of the present invention relates to novel metal boride precursor complexes. One such complex obtained by the thermolysis of the appropriate metal borohydride comprises

$$[M(B_2H_6)_x(BH_4)_y]_n \qquad (I)$$

wherein
M is zirconium or hafnium;
x is from about 0.5 to about 2;
y is from 0 to about 3, provided that 2x+y is 4; and
n is at least 2.

The boron to metal ratio in this complex is about 4.

This complex is generated by a process of the present invention, the liquid phase thermolysis of the corresponding metal borohydride, $M(BH_4)_4$. The borohydride is heated neat, or in a hydrocarbon solvent, such as toluene or heptane, to a temperature of at least about 100° C. in an inert atmosphere. Suitable inert atmospheres include argon, nitrogen or helium. At about 100° C., heating for several days (5 to 10) is required. At higher temperatures a shorter heating period is required. The complex is obtained as a mixture of a soluble intermediate and a black insoluble solid according to the following reaction:

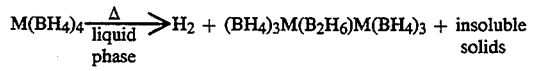

$$M(BH_4)_4 \xrightarrow[\text{liquid phase}]{\Delta} H_2 + (BH_4)_3M(B_2H_6)M(BH_4)_3 + \text{insoluble solids}$$

The soluble intermediate $(BH_4)_3M(B_2H_6)M(BH_4)_3$ has been characterized. The conversion of $(BH_4)^-$ ligands into $(B_2H_6)^{2-}$ bridges leads to a mixture of oligomers having the empirical formula (I), $[M(B_2H_6)_x(BH_4)_y]_n$. Heating this mixture above about 200° C. liberates more hydrogen with formation of the metal borides $MB_z$ wherein z is about 4.

A further metal boride precursor complex of the present invention comprises a mixture of oligomers of formula (II), obtained by reaction of the appropriate metal borohydride with a Lewis base,

$$[MB_2H_x]_n \qquad (II)$$

wherein
M is zirconium or hafnium; and
x is from 0 to 9; and n is at least 4. This complex has a boron to metal ratio of about 2.

Another aspect of the present invention is a process for the generation of the above complex of formula (II) from solution comprising contacting a solution of $M(BH_4)_4$ wherein M is zirconium or hafnium with a Lewis base (LB) to yield the desired precursor complex as a solid precipitate or film. This reaction is as follows:

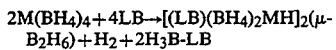

2M(BH$_4$)$_4$+4LB→[(LB)(BH$_4$)$_2$MH]$_2$($\mu$-B$_2$H$_6$)+H$_2$+2H$_3$B-LB

In favorable cases when the Lewis base is a large bulky group, such as triphenylphosphine, the above intermediate is unstable with respect to dissociation of the Lewis base. Once liberated, the Lewis base extracts another BH$_3$ and a soluble, base-free intermediate is formed according to the following reaction:

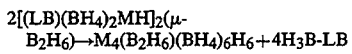

2[(LB)(BH$_4$)$_2$MH]$_2$($\mu$-B$_2$H$_6$)→M$_4$(B$_2$H$_6$)(BH$_4$)$_6$H$_6$+4H$_3$B-LB

As further hydrogen is evolved, the metal borane complex of formula (II) precipitates as a black solid. Heating the solid of formula (II) above about 200° C. yields the metal boride MB$_x$ wherein x is about 2.

Suitable Lewis bases for use in this reaction sequence include phosphines, arsines, amines and ethers. Preferred are the phosphines, especially aryl- or alkylphosphines having a cone angle greater than 135°. For further discussion of cone angle, see Rahman et al., *Organometallics*, 6, 650-658 (1987). Most preferred are the arylphosphines. Use of a bulky tertiary phosphine leads to hydrogen evolution, formation of (B$_2$H$_6$)$^{2-}$ bridges, and precipitation of a base free solid of formula (II). Other phosphines useful herein include tri-t-butylphosphine, tricyclohexylphosphine, triphenylphosphine, tri-p-tolylphosphine, methyldiphenylphosphine, triisopropylphosphine, bis(diphenylphosphino)ethane, bis(diphenylphosphino)propane, bis(diphenylphosphino)butane, or bis(di-p-tolylphosphino)ethane.

The above reactions using the Lewis base are conducted at a temperature of from about $-20°$ C. to about $25°$ C. for a period of from about 1 to about 24 hours. The concentration of the Lewis base is determined so as to prevent precipitation of colorless H$_3$B-LB. The product of formula (II) precipitates as a black film or solid and is washed extensively with fresh solvent to ensure removal of any H$_3$B-LB. The composition of the solid has an empirical formula MB$_{1.8-2.0}$H$_{3-6}$. Heating the solid above 200° C. yields a metal boride coating of approximate composition MB$_z$ wherein z is about 1.6-1.9.

The complexes of the present invention are useful as precursors to metal borides. The metal borides have many uses in the ceramic, electronic and optical industries. Examples include their use as films for microelectronic applications, ceramic powders, coatings for electrodes or metal cutting tools, or coatings in nozzles, valves and the like, in the aerospace industry.

The complexes and processes of the present invention are further illustrated by the following examples.

EXAMPLE 1

The following Example describes the formation of a Zr boride precursor via thermolysis of neat Zr(BH$_4$)$_4$ at 100° C.

A thick-walled glass vessel was loaded with 3 g (20 mmol) Zr(BH$_4$)$_4$, freeze-pump-thaw degassed and sealed off in vacuo. The tube was then heated at 100° C. for 5 days to give a black solid. After any unreacted Zr(BH$_4$)$_4$ was removed by sublimation, the tube was brought into a nitrogen-purged glove box and opened. The black solids were washed with 2×10 mL of hexane, toluene, then THF and dried in vacuo to give 150 mg black solids. Elemental analysis gave the formula ZrB$_{3.8}$C$_{0.6}$H$_{9.9}$ (total=81%) which corresponds to ZrB$_{3.8}$H$_{8.7}$(THF)$_{0.15}$ with some further O contamination.

EXAMPLE 2

This example describes the isolation of a white, volatile intermediate formed in the thermal decomposition of Hf(BH$_4$)$_4$, and a reddish-brown, non-volatile precursor of hafnium boride, and includes a thermogravimetric analysis.

Hf(BH$_4$)$_4$, 1.0 g, was heated in a closed 10 mL stainless steel pressure vessel for 3 hr at 120° C. At ambient temperature, the vessel was opened and gases were allowed to escape. The remaining products were washed out of the vessel with toluene. Under a pressure of ca. 0.1 millitorr, toluene was evaporated from the mixture at ambient temperature to leave a residue of 0.330 g of solids. As the temperature was increased from ambient to 120° C., 0.030 g of white (BH$_4$)$_3$Hf(B$_2$H$_6$)Hf(BH$_4$)$_3$ sublimed from the mixture ($^{11}$B NMR [$^1$H-decoupled], toluene-d$_8$, $-0.50$ (br s, 2B, B$_2$H$_6$), $-9.0$ ppm (s, 6B, BH$_4$). A portion of the reddish-brown non-volatile residue was washed with toluene and pentane, and dried under vacuum for 12 hr at ambient temperature. The TGA of this solid (FIG. 1) showed 3% loss of weight near 190° C. No further loss of weight occurred below 1000° C.

EXAMPLE 3

The following Example describes NMR experiments which showed that an initially-formed intermediate with Zr-P bonds was converted to a soluble, Lewis base-free zirconium borane complex prior to deposition of the black solid.

A solution of 139 mg (0.53 mmol) PPh$_3$ in 1 mL of toluene-d$_8$ was added. to a solution of 40 mg (0.27 mmol) Zr(BH$_4$)$_4$ in 0.5 mL of toluene-d$_8$ at $-80°$ C. using a cold well inside a nitrogen-purged glove box. The $^{31}$P, $^1$H and $^{11}$B NMR spectra were then recorded as a function of time at $-20°$ C. An intermediate, proposed to be [Zr(BH$_4$)$_2$(PPh$_3$)]$_2$-($\mu$-H)$_2$($\mu$-B$_2$H$_6$), was observed initially ($^{31}$P{$^1$H}: 16.5 ppm (broad); $^1$H: $\delta$ 4.87 (Zr-H); $^{11}$B: $-4.7$ (br, 2B, B$_2$H$_6$) and $-10.9$ ppm (quintet, J$_{BH}$=85 Hz, 4B, BH$_4$)) along with Ph$_3$P-BH$_3$ ($^{31}$P{$^1$H}: 22.9 ppm (br); $^{11}$B: $-38.2$ ppm (d, J$_{BP}$=44 Hz)). At 25° C. the solution turned dark brown and precipitated colorless crystals of Ph$_3$P-BH$_3$. The $^{31}$P NMR showed only Ph$_3$P-BH$_3$ while $^{11}$B and $^1$H NMR spectra indicated a soluble species proposed to be Zr$_4$(B$_2$H$_6$)(BH$_4$)$_6$H$_6$ ($^1$H: $\delta$ 4.69 (4H), 4.50 (2H); $^{11}$B: $-11.3$ (br, B$_2$H$_6$), $-13.9$, $-15.0$ ppm (quint, BH$_4$)).

EXAMPLE 4

The following Example describes NMR experiments which showed that the same soluble, Lewis Base-free zirconium borane complex is formed with PPh$_3$ and CH$_2$(PPh$_2$)$_2$.

A solution of 154 mg (1.0 mmol) Ph$_2$PCH$_2$PPh$_2$ in 1 mL of THF-d$_8$ was added to a solution of 30 mg (0.5 mmol) Zr(BH$_4$)$_4$ in 0.5 mL of THF-d$_8$. $^{31}$P, $^1$H and $^{11}$B NMR of this solution showed only Ph$_2$PCH$_2$PPh$_2$-BH$_3$ ($^{31}$P{$^1$H}: 17.0, $-25.2$ ppm (d, $^2$J$_{PP}$=70 Hz); $^{11}$B: $-38.4$ ppm (br)) and the same P-free soluble species discussed in Example 3.

EXAMPLE 5

The following Example describes NMR experiments which showed that an intermediate is formed in which $H_3B$-$P(t$-$Bu)_3$ acts as a chelating ligand to Zr through bridging H's.

A solution of 107 mg (0.53 mmol) $P(t$-$Bu)_3$ in 1 mL of toluene-$d_8$ was added to a solution of 40 mg (0.27 mmol) $Zr(BH_4)_4$ in 0.5 mL of toluene-$d_8$ at $-80°$ C. $^{31}P$, $^1H$ and $^{11}B$ NMR spectra of this dark brown solution indicated both free and Zr-complexed $H_3B$-$P(t$-$Bu)_3$ ($^{31}P\{^1H\}$: 61.0 (quart, $J_{PB}=56$ Hz, $H_3B$-$P(t$-$Bu)_3$), 49.6 ppm (quart, $J_{PB}=121$ Hz, $Zr$-$H_3B$-$P(t$-$Bu)_3$); $^{11}B$: $-28.4$ (d, 121 Hz, $Zr$-$H_3B$-$P(t$-$Bu)_3$), $-40.8$ ppm (d, 56 Hz, $H_3B$-$P(t$-$Bu)_3$)) in addition to a P-free soluble species ($^1H$: δ 4.80, 4.66 (br, Zr-H); $^{11}B$: $-8.6$, $-10.3$ (br, $B_2H_6$), $-11.9$, $-12.4$, $-13.6$ ppm (quint, $BH_4$)). After several weeks the Zr-complexed $H_3B$-$P(t$-$Bu)_3$ was gone and only the P-free soluble species remained.

EXAMPLE 6

The following Example describes the reaction of $Zr(BH_4)_4$ and 2 equivalents of $P(t$-$Bu)_3$ and shows that little B is lost upon heating the precursor to 200° C.

A solution of 2.69 g (13.3-mmol) $P(t$-$Bu)_3$ in 10 mL of toluene was added to a solution of 1.00 g (6.65 mmol) $Zr(BH_4)_4$ in 20 mL of toluene at $-100°$ C. Upon warming slowly to $-20°$ C. the solution turned from yellow to amber to dark brown. After 7 days at $-20°$ C. the resulting black solid was filtered off and dried in vacuo for 10 hr to yield 814 mg. A portion of the resulting solid (700 mg) was heated in vacuo to about 200° C. which gave $H_2$ and 67 mg of white crystals of $H_3B$-$P(t$-$Bu_3)$. Elemental analysis of the remaining black solid gave the formula $ZrB_{2.1}C_{2.9}H_{8.2}P_{0.3}$ with only 93% of the mass accounted for. While the incomplete removal of $H_3B$-$P(t$-$Bu)_3$ leads to C, H, and P contamination it is clear that little B was lost upon heating the black solid.

EXAMPLE 7

The following Example is a repeat of Example 5 and includes the Thermogravimetric Analysis (TGA) which shows little weight loss at 200°–750° C.

A solution of 2.69 g (13.3 mmol) $P(t$-$Bu)_3$ in 10 mL of toluene was added to a solution of 1.00 g (6.65 mmol) $Zr(BH_4)_4$ in 20 mL of toluene at $-100°$ C. Upon warming slowly to $-20°$ C. the solution turned from yellow to amber to dark brown. After 7 hr at $-20°$ C. the solution was warmed to 25° C. After 14 more hr, the resulting black precipitate was filtered off, washed with $3\times100$ mL of hexane and dried in vacuo to yield 720 mg. This solid was then washed with $4\times10$ mL of hot (95° C.) toluene, $4\times10$ mL of hexane and dried in vacuo to give 624 mg black solid. Elemental analysis showed a formula of $ZrB_{1.7}C_{1.3}H_{5.1}P_{0.1}$ corresponding to $ZrB_{1.6}H_{1.9}[H_3B$-$P(t$-$Bu)_3]_{0.1}$-$(THF)_{0.05}$ where the THF originated from the glove box atmosphere. The TGA of the black solids indicated two distinct major weight-loss regimes with a total weight loss of 9%.

EXAMPLE 8

The following Example describes the reaction of $Zr(BH_4)_4$ with 2 equivalents of $PPh_3$ and includes a thermogravimetric analysis (TGA) which showed only 7% weight loss, which all occurred below 200° C.

Figure 2:
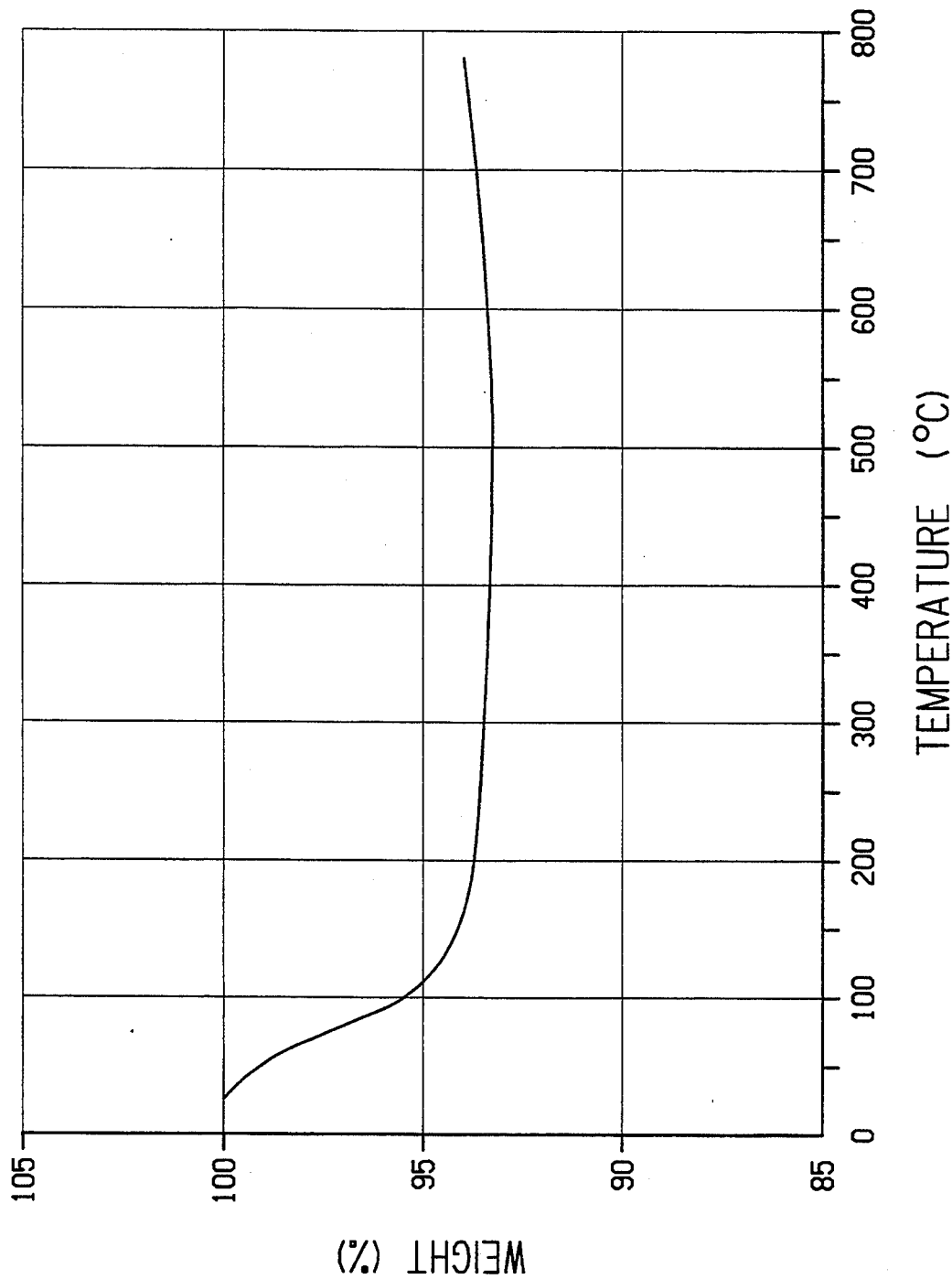
FIG. 2 is a thermogravimetric analysis (TGA) of the product of Example 8.

A solution of 5.3 g (20.2 mmol) $PPh_3$ in 300 mL of toluene was added to a solution of 1.5 g (10 mmol) $Zr(BH_4)_4$ in 100 mL of-toluene at 25° C. The solution turned amber, then dark brown. After 14 hr the resulting black solid was filtered off, washed with $3\times20$ mL of toluene, then hexane and dried in vacuo to yield 2.42 g. The resulting solids were washed with hot (95° C.) toluene (ca $9\times20$ mL) until the washings left negligible residue upon evaporation. The resulting solid was washed with $3\times20$ mL of hexane and dried in vacuo to yield 1.23 g black solids. Elemental analysis gave the formula $ZrB_{1.7}C_{2.0}H_{4.7}$ for a total of 97% not including P, which was not obtained. C contamination occurred either from THF or from $H_3B$-$PPh_3$. The TGA of the black solids, shown in FIG. 2, indicated about a 7% weight loss with no further events from 200°–750° C.

EXAMPLE 9

Using a cold well inside a nitrogen glove box, a solution of 539 mg (2.05 mmol) $PPh_3$ in 20 mL of toluene was added to a solution of 151 mg (1 mmol) $Zr(BH_4)_4$ in 10 mL of toluene at $-100°$ C. The reaction vessel was then sealed, removed from the glove box and attached to the high vacuum line. After three freeze-pump-thaw cycles the reaction was warmed to 0° C. using an ice bath. After 20 hr the non-condensable gases were measured using a Toepler pump and determined to be 0.45 mmol $H_2$/Zr. The reaction was then warmed to 25° C. and after 66 hr the reaction vessel was returned to the glove box. The resulting black solid was filtered using a fine frit, washed with $3\times50$ mL of toluene and dried in vacuo to yield 108 mg. Elemental analysis of the black solid indicated the formula $ZrB_{1.9}H_{3.5}(H_3B$-$PPh_3)_{0.1}(THF)_{0.2}$.

EXAMPLE 10

The following Example taken together with Example 9 shows that the black solid precursor loses $H_2$ at 25° C. (this example at 25° C. gives 0.85 mmol $H_2$/mmol Zr while the Example 9 kept at 0° C. only gave 0.45 mmol $H_2$/mmol Zr).

A solution of 526 mg (2.0 mmol) $PPh_3$ in 20 mL of toluene was added to a solution of 151 mg (1.0 mmol) $Zr(BH_4)_4$ in 20 mL of toluene at $-100°$ C. using a cold well inside the glove box. The vessel was closed, removed from the glove box and attached to the vacuum line. After freeze-pump-thaw degassing, the solution was stirred at 0° C. for 12 hr and at 25° C. for 14 hr. The evolved $H_2$ was measured using a Toepler pump to give 0.85 mmol $H_2$/mmol Zr. The black solid was then filtered off, washed with $3\times10$ mL of hot (95° C.) toluene and dried in vacuo to yield 134 mg. Elemental analysis gave the formula $ZrB_{1.5}C_{2.4}H_{5.4}P_{0.09}$ which corresponds to $ZrB_{1.4}H_{2.2}(H_3B$-$PPh_3)_{0.1}(THF)_{0.2}$.

What is claimed is:

1. A metal boride precursor complex comprising the following formula (I)

$$[M(B_2H_6)_x(BH_4)_y]_n \qquad (I)$$

wherein

M is zirconium or hafnium;

x is from about 0.5 to about 2;

y is from 0 to about 3, provided that $2x+y$ is 4; and n is at least about 2.

2. A metal boride precursor complex comprising a mixture of oligomers having the formula (II)

$$[MB_2H_x]_n \qquad (II)$$

wherein

M is zirconium or hafnium;

x is from 0 to 9; and n is at least 4.

3. A complex comprising $M_4(B_2H_6)(BH_4)_6H_6$ wherein

M is zirconium or hafnium.

4. A complex comprising $$[(LB)(BH_4)_2MH]_2(B_2H_6)$$

wherein

LB is a Lewis base; and

M is zirconium or hafnium.

5. The complex of claim 4 wherein the Lewis base is a phosphine, arsine, amine or ether.

6. The complex of claim 5 wherein the Lewis base is an aryl or alkyl phosphine having a cone angle of greater than 135°.

7. The complex of claim 6 wherein the Lewis base is triphenyl phosphine.

8. A process for producing metal boride precursors having the following formula (I)

$$[M(B_2H_6)_x(BH_4)_y]_n$$

wherein

M is zirconium or hafnium;

x is from about 0.5 to about 2;

y is from 0 to about 3, provided that $2x+y$ is 4; and n is at least about 2;

comprising thermolysis of the corresponding metal borohydride neat or in a hydrocarbon solvent to a temperature of at least about 100° C.

9. The process of claim 8 wherein the thermolysis is conducted in an inert atmosphere.

10. A process for producing metal boride precursors wherein said precursor comprises an oligomer having the following formula (II):

$$[MB_2H_x]_n$$

wherein

M is zirconium or hafnium; and x is from 0 to 9; and n is at least 4;

comprising contacting a solution of $M(BH_4)_4$ wherein M is zirconium or hafnium with a Lewis base comprising a phosphine, arsine, amine or ether to yield said precursor as a solid precipitate or film.

11. The process of claim 10 wherein the Lewis base is an aryl or alkyl phosphine having a cone angle of greater than 135°.

12. The process of claim 11 wherein the Lewis base is triphenyl phosphine.

13. The process of claim 10 wherein the reaction is conducted at a temperature of from about −20° C. to about 25° C. for a period of from about 1 to about 24 hours.

14. A metal boride precursor produced by the process of claim 8.

15. A metal boride precursor produced by the process of claim 10.

* * * * *